United States Patent
Chen et al.

(10) Patent No.: US 10,498,054 B1
(45) Date of Patent: Dec. 3, 2019

(54) JUMPER AND POWER DISTRIBUTION DEVICE

(71) Applicants: LITE-ON ELECTRONICS (GUANGZHOU) LIMITED, Guangzhou (CN); Lite-On Technology Corporation, Taipei (TW)

(72) Inventors: Shih-Ming Chen, Taipei (TW); Chien-Chih Lee, Taipei (TW); Yong-Long Lee, Taipei (TW); Kun-Ta Yang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/172,886

(22) Filed: Oct. 29, 2018

(30) Foreign Application Priority Data

Aug. 28, 2018 (CN) .......................... 2018 1 0986804

(51) Int. Cl.
*H01R 31/08* (2006.01)
*H01R 9/26* (2006.01)
*H01R 9/24* (2006.01)
*H02B 1/20* (2006.01)

(52) U.S. Cl.
CPC ......... *H01R 9/2675* (2013.01); *H01R 9/2458* (2013.01); *H02B 1/205* (2013.01)

(58) Field of Classification Search
CPC ...... H01R 11/281; H01R 11/24; H01R 31/08; H01R 31/085
See application file for complete search history.

(56) References Cited

U.S. PATENT DOCUMENTS

| | | | | |
|---|---|---|---|---|
| 4,950,178 A | * | 8/1990 | Harvey ................. | H01R 31/08 439/247 |
| 5,921,810 A | * | 7/1999 | Murakoshi ............ | H01R 31/08 439/510 |
| 6,547,572 B1 | * | 4/2003 | Burdick .............. | B60R 16/0238 439/76.2 |
| 7,497,582 B1 | * | 3/2009 | Savicki, Jr. .............. | H01H 9/52 200/317 |
| 9,397,452 B1 | * | 7/2016 | Fan ........................ | H01R 31/08 |
| 2005/0013563 A1 | * | 1/2005 | Woodruff ............. | H01R 9/0515 385/101 |
| 2005/0095904 A1 | * | 5/2005 | Reibke ................. | H01R 9/2675 439/507 |

(Continued)

*Primary Examiner* — Truc T Nguyen
(74) *Attorney, Agent, or Firm* — JCIPRNET

(57) ABSTRACT

A jumper is adapted to be disposed between two sockets. Each of the sockets has at least one conductive terminal. The jumper includes an insulative body and at least one conductive body, which includes a main body portion, a first engaging portion, and a second engaging portion. The main body portion is connected to the insulative body. The first and second engaging portions are respectively located at two opposite sides of the main body portion, and extend respectively from two opposite sides of the insulative body. The first engaging portion engages the conductive terminal of one of the sockets. The second engaging portion engages the conductive terminal of another one of the sockets, such that the conductive terminals are electrically connected. A power distribution device is also provided.

22 Claims, 8 Drawing Sheets

(56) References Cited

U.S. PATENT DOCUMENTS

| | | | |
|---|---|---|---|
| 2006/0160413 A1* | 7/2006 | Robinson | H01R 13/112 |
| | | | 439/511 |
| 2008/0160838 A1* | 7/2008 | Adunka | H01R 9/2491 |
| | | | 439/715 |
| 2008/0180884 A1* | 7/2008 | Parrish | B60R 16/0238 |
| | | | 361/624 |
| 2010/0203757 A1* | 8/2010 | Mostoller | F21V 19/0055 |
| | | | 439/510 |
| 2013/0089996 A1* | 4/2013 | Zhao | H01M 2/206 |
| | | | 439/212 |
| 2019/0067843 A1* | 2/2019 | Menez | H01M 10/6553 |

* cited by examiner

JUMPER AND POWER DISTRIBUTION DEVICE

CROSS-REFERENCE TO RELATED APPLICATION

This application claims the priority benefit of China application serial no. 201810986804.1, filed on Aug. 28, 2018. The entirety of the above-mentioned patent application is hereby incorporated by reference herein and made a part of this specification.

BACKGROUND OF THE INVENTION

Field of the Invention

The invention relates to a jumper and a power distribution device, and especially relates to a jumper and a power distribution device using the jumper.

Description of Related Art

In a conventional power distribution unit (PDU), a conductive terminal of a socket is usually divided into a live terminal, a neutral terminal, and a ground terminal. To achieve electrical series connection of two adjacent sockets, the live terminals, the neutral terminals, and the ground terminals of the adjacent sockets are required to be respectively and electrically connected via a respective conductor.

Generally, in this series connection between two adjacent sockets of the power distribution unit, two adjacent live terminals, two adjacent neutral terminals, and two adjacent ground terminals of the adjacent sockets are respectively connected with a plurality of conductive wires. However, connection via the conductive wires may cause several issues, for example, wire detachment, short circuit, and poor contact, etc., making products less reliable. Further, in the process of assembling two adjacent sockets of the power distribution unit in series, an operator needs to align two ends of the conductive wire to each terminal, and then fix two corresponding terminals together by solder. Such operation is inconvenient and takes a relatively long time for assembly.

SUMMARY OF THE INVENTION

The invention provides a jumper and a power distribution device, which improve product reliability and reduce time for assembly.

The jumper of the present invention is adapted to be disposed between two sockets. Each of the sockets has at least one conductive terminal. The jumper includes an insulative body and at least one conductive body. The conductive body includes a main body portion, a first engaging portion, and a second engaging portion. The main body portion is connected to the insulative body. The first engaging portion and the second engaging portion are respectively located on opposite sides of the main body portion, and extend respectively from opposite sides of the insulating body. The first engaging portion engages the conductive terminal of one of the sockets, and the second engaging portion is connected to the conductive terminal of the other one of the sockets, such that two conductive terminals are electrically connected to each other.

In an embodiment of the invention, the first engaging portion has a locking slot. The second engaging portion has a second locking slot. The conductive terminal of the one of the sockets passes through the first locking slot, and the conductive terminal of the other one of the sockets passes through the second locking slot.

In an embodiment of the invention, the first engaging portion further has a first protrusion located in the first locking slot. The second engaging portion further has a second protrusion located in the second locking slot. Each of the conductive terminals has a through hole. The first protrusion engages the through hole of one of the conductive terminals, and the second protrusion engages the through hole of the other one of the conductive terminals.

In an embodiment of the invention, the first engaging portion includes a first limiting part and two first hooks extending from opposite sides of the first limiting part. One of the first hooks is bent toward the other one of the first hooks and the first limiting part. The second engaging portion includes a second limiting part and two second hooks extending from opposite sides of the second limiting part. One of the second hooks is bent toward the other one of the second hooks and the second limiting part.

In an embodiment of the invention, the conductive terminal of the one of the sockets passes between the first hooks and the first limiting part, and contacts an end of each of the first hooks. The conductive terminal of the other one of the sockets passes between the second hooks and the second limiting part, and contacts an end of each of the second hooks.

In an embodiment of the invention, the at least one conductive body includes a plurality of conductive bodies. The conductive bodies include two first conductive bodies and a second conductive body. The second conductive body is located between the first conductive bodies. The main body portion of each of the first conductive bodies and the main body portion of the second conductive body are disposed inside the insulative body.

In an embodiment of the invention, the first engaging portions of the first conductive bodies are aligned with each other. A shortest connection line between the first engaging portions of the first conductive bodies is spaced apart with a distance from the first engaging portion of the second conductive body.

In an embodiment of the invention, the second engaging portions of the first conductive bodies are aligned with each other. A shortest connection line between the second engaging portions of the first conductive bodies is spaced apart with a distance from the second engaging portion of the second conductive body.

In an embodiment of the invention, the first locking slots of the first engaging portions of the first conductive bodies are aligned with each other. An opening of one of the first locking slots faces an opening of the other one of the first locking slots.

In an embodiment of the invention, the second locking slots of the second engaging portions of the first conductive bodies are aligned with each other. An opening of one of the second locking slots faces an opening of the other one of the second locking slots.

In an embodiment of the invention, the insulative body is provided with at least one first stopping portion on a side which the first engaging portion extends therefrom. The insulating body is provided with at least one second stopping portion on a side which the second engaging portion extends therefrom.

In an embodiment of the invention, solder materials are disposed at a junction between the first engaging portion and the conductive terminal of the one of the sockets, and disposed at a junction between the second engaging portion and the conductive terminal of the other one of the sockets, respectively. The first engaging portion is electrically connected to the conductive terminal of the one of the sockets, and the second engaging portion is electrically connected to the conductive terminal of the other one of the sockets.

The power distribution device of the invention includes two sockets and the aforementioned jumper. Each of the sockets has at least one conductive terminal, and two conductive terminals are electrically connected to each other through the jumper.

Based on the above description, the power distribution device of the invention uses a jumper to electrically connect two adjacent sockets with each other. Furthermore, each of the sockets includes at least one conductive terminal, and the opposite ends of the conductive body of the jumper may be respectively connected to and engages two adjacent conductive terminals. Based on the engagement between the conductive body and the conductive terminals, the jumper is not easily detached from the conductive terminals, thereby preventing occurrence of wire detachment, short circuit, and poor contact, etc., and improving product reliability. In addition, an operator can complete the engagement between the conductive terminals and the conductive body in a quick manner, so as to allow electrical connection of the conductive terminals, thereby increasing the production efficiency. Hence, design of the jumper of the invention is advantageous to the assembly work for the operator, and can significantly reduce assembly time.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
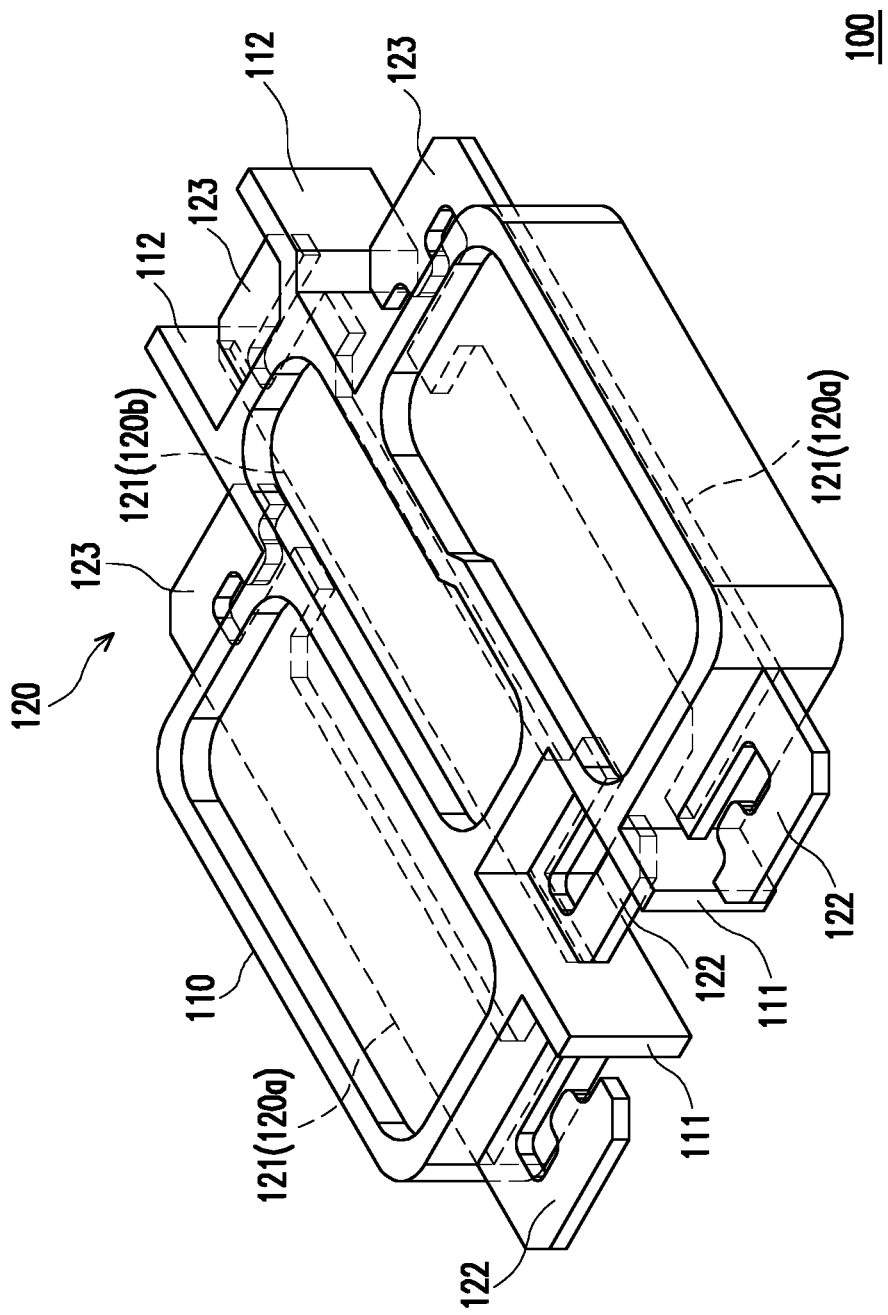
FIG. 1 illustrates a schematic view of a jumper according to an embodiment of the invention.
Figure 2:
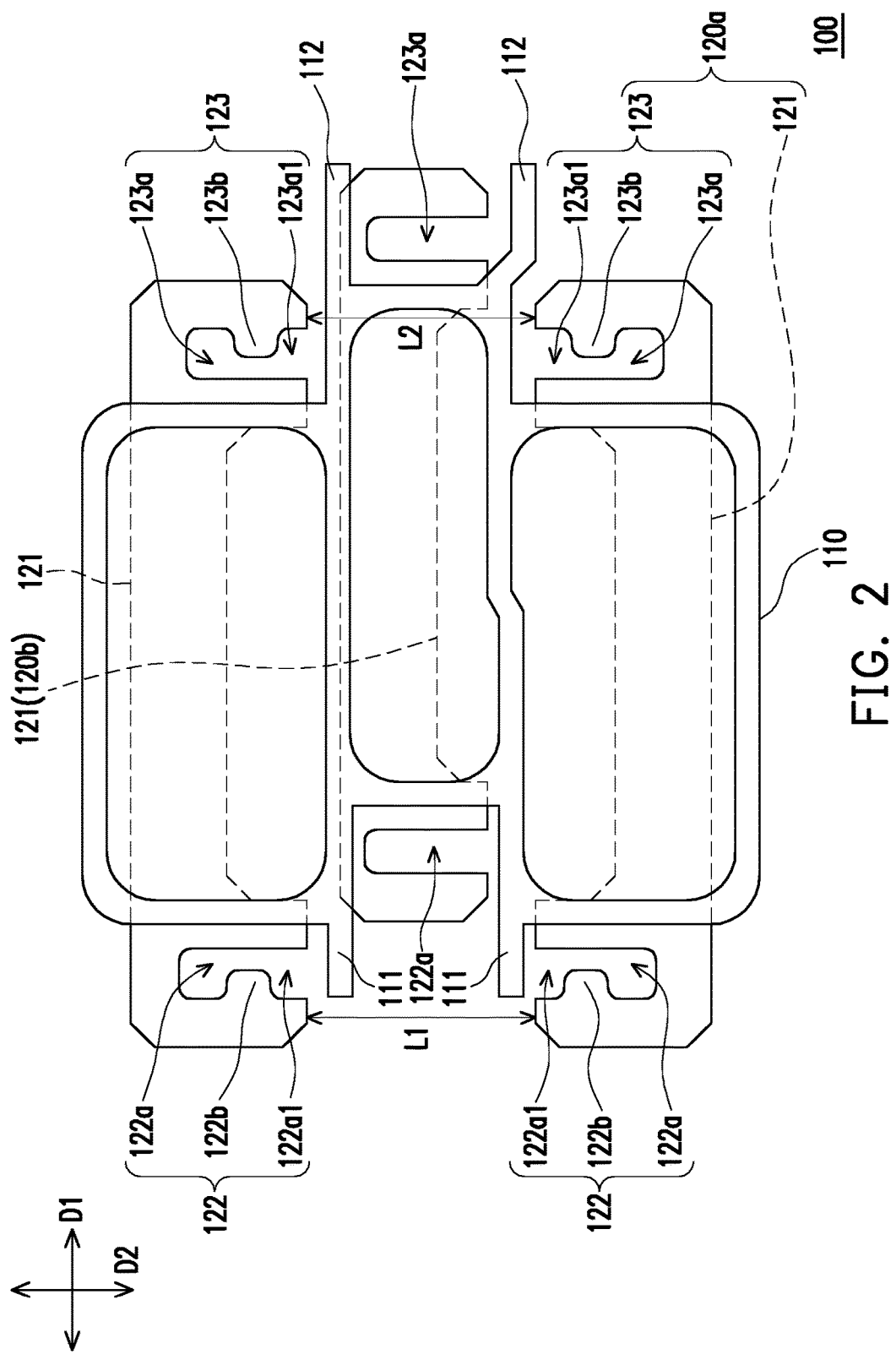
FIG. 2 illustrates a top view of the jumper according to FIG. 1.
Figure 3A:
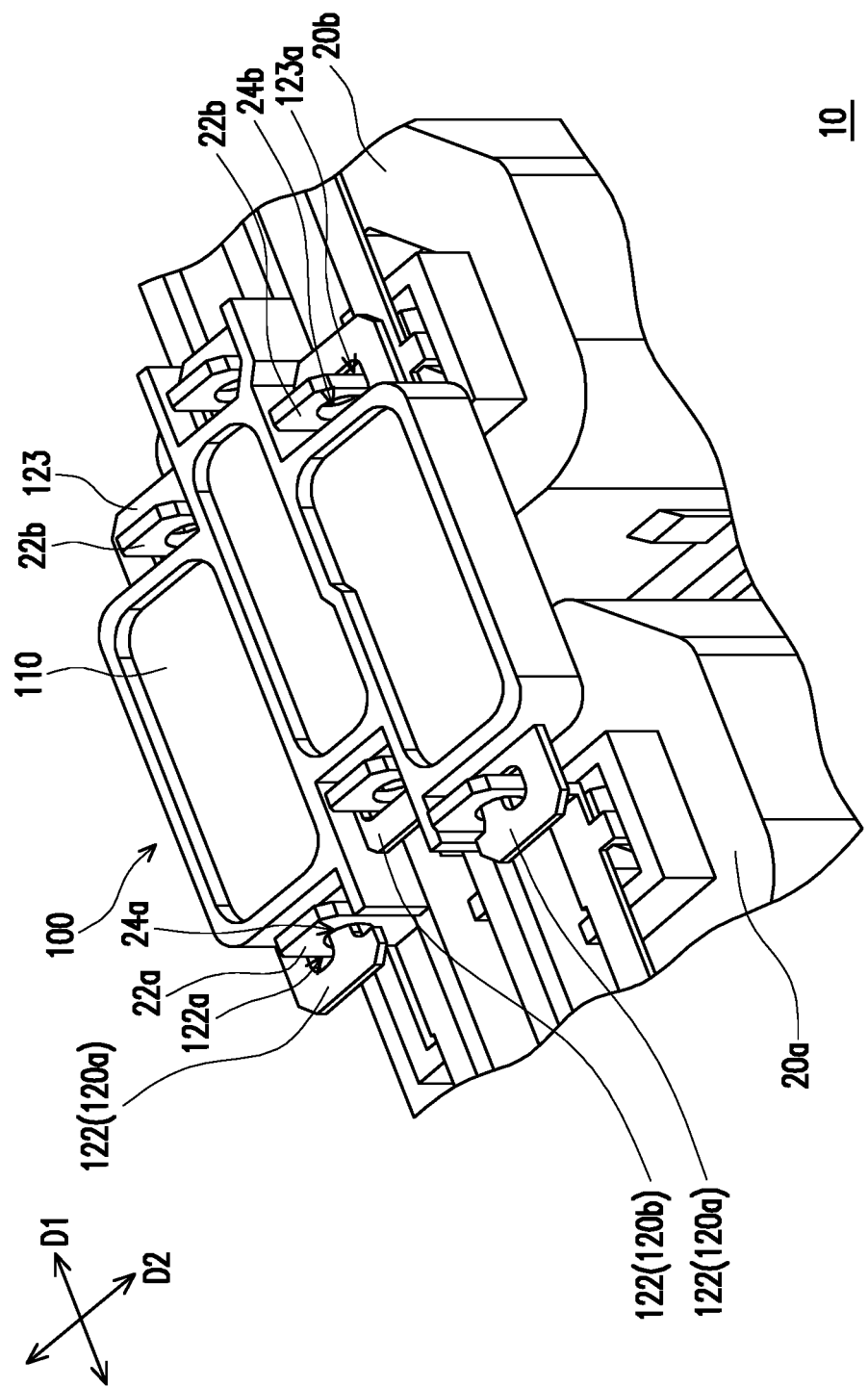
FIG. 3A illustrates a schematic view of the jumper shown in FIG. 1 being connected between two sockets of a power distribution unit which is partially shown.
Figure 3B:
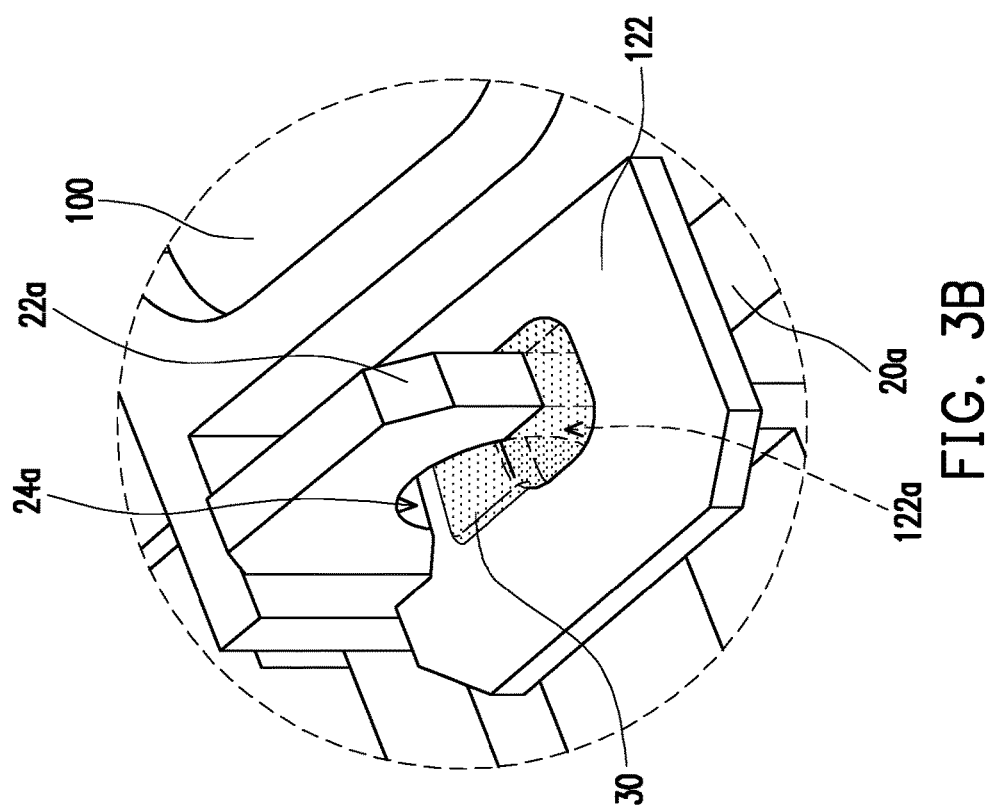
FIG. 3B illustrates an enlarged schematic view showing a solder material that is disposed between a junction of an engaging portion and a conductive terminal of FIG. 3A.

FIG. 1 illustrates a schematic view of a jumper according to an embodiment of the invention. FIG. 2 illustrates a top view of the jumper according to FIG. 1. FIG. 3A illustrates a schematic view of the jumper shown in FIG. 1 being connected between two sockets of the power distribution unit which is partially shown. FIG. 3B illustrates an enlarged schematic view showing a solder material that is disposed between a junction of an engaging portion and a conductive terminal of FIG. 3A. With reference to FIG. 1, FIG. 2 and FIG. 3A, in this embodiment, the power distribution device 10 includes at least two sockets (a first socket 20a and a second socket 20b adjacent to each other are schematically illustrated) and a jumper 100. The jumper 100 is disposed between the first socket 20a and the second socket 20b, so as to allow serial connection of the first socket 20a and the second socket 20b. In other embodiments, number of the sockets may be greater than two, and number of the jumper may be more than one. Specifically, the number of sockets may be n, wherein n is a positive integer and is greater than or equal to 2 (n≥2). The number of jumpers is n−1.

The first socket 20a and the second socket 20b are respectively provided with at least one conductive terminal. In this embodiment, each socket is provided with three conductive terminals, but the invention is not limited thereto. Herein, the first socket 20a is provided with three conductive terminals 22a, which are a live terminal, a neutral terminal, and a ground terminal, respectively. Similarly, the second socket 20b is provided with three conductive terminals 22b, which are a live terminal, a neutral terminal, and a ground terminal, respectively. The live terminal of the first socket 20a and the live terminal of the second socket 20b are in alignment and electrically connected in series through the jumper 100. The neutral terminal of the first socket 20a and the neutral terminal of the second socket 20b are in alignment and electrically connected in series through the jumper 100. The ground terminal of the first socket 20a and the ground terminal of the second socket 20b are in alignment and electrically connected in series through the jumper 100.

In this embodiment, the jumper 100 includes an insulative body 110 and at least one conductive body 120. Herein, number of the conductive body 120 is in accordance to the number of the terminals in each socket, for example, the number of the conductive body 120 is three, and each conductive body is arranged in series. The material of the insulative body 110 may be rubber, silicone, plastic, or other electrically insulating materials. Each conductive body 120 includes a main body portion 121, a first engaging portion 122, and a second engaging portion 123. Specifically, the three main body portions 121 are connected to the insulative body 110, and are disposed inside (i.e., embedded in) the insulative body 110. Each of the first engaging portions 122 and a respective one of the second engaging portions 123 are respectively located on opposite sides of the main body portion 121, and respectively extend from opposite sides of the insulative body 110. In other words, each of the first engaging portions 122 and the respective one of the second engaging portions 123 are exposed outside of the insulative body 110, in order to respectively engage and lock two aligned live terminals, two aligned neutral terminals, or two aligned ground terminals. For example, the jumper 100 may be fabricated by insert molding process, but the invention is not limited thereto. In other embodiments, the main body portion may not be embedded in the insulative body, but the main body portion may be fixed to an outside of the insulative body by locking, gluing, snapping or other suitable fixing methods.

More specifically, in this embodiment, each of the conductive bodies 120 may respectively engage a conductive terminal 22a and a conductive terminal 22b which are in alignment with each other, via the first engaging portion 122 and the second engaging portion 123 extending out of the insulative body 110, so that each conductive terminal 22a and the corresponding conductive terminal 22b are electrically connected to each other. Based on the engagement between each of the conductive bodies 120 and the corresponding conductive terminal 22a and the conductive terminal 22b, the jumper 100 is not easily detached from the conductive terminals 22a and the conductive terminals 22b. Therefore, occurrence of wire detachment, short circuit, or poor contact, etc. can be prevented, so as to improve product reliability. In addition, an operator can achieve the engagement between each conductive body 120 and the corresponding conductive terminals 22a and conductive terminals 22b in a quick manner, so as to allow electrical connection of the corresponding conductive terminals 22a and conductive terminals 22b, thus the production efficiency is increased. Hence, design of the jumper 100 of the invention is advantageous to the assembly work of the operator in production line, and can significantly reduce assembly time.

Referring to FIG. 1, FIG. 2, FIG. 3A, and FIG. 3B, based on one of the conductive bodies 120 and the corresponding conductive terminals 22a and conductive terminals 22b, detail description thereof is described below. In this embodiment, the first engaging portion 122 of the conductive body 120 has a first locking slot 122a. The second engaging portion 123 of the conductive body 120 has a second locking slot 123a. The conductive terminal 22a passes through the first locking slot 122a, and the conductive terminal 22b passes through the second locking slot 123a. In the assembly process, first, the first locking slot 122a of the first engaging portion 122 is aligned with the conductive terminal 22a, and the second locking slot 123a of the second engaging portion 123 is aligned with the conductive terminal 22b. Then, the jumper 100 is pressed toward the first socket 20a and the second socket 20b, the conductive terminal 22a passes through the first locking slot 122a and engages the first locking slot 122a, and the conductive terminal 22b passes through the second locking slot 123a and engages the second locking slot 123a. Based on this structural arrangement, the degree of freedom for the movement in a first direction (D1) of the jumper 100 connected in series between the first socket 20a and the second socket 20b is limited.

The first engaging portion 122 further has a first protrusion 122b located in the first locking slot 122a. The second engaging portion 123 further has a second protrusion 123b located in the second locking slot 123a. Accordingly, the conductive terminal 22a has a through hole 24a, and the conductive terminal 22b has a through hole 24b. In the assembly process, after the conductive terminal 22a passes through the first locking slot 122a, the first protrusion 122b engages the through hole 24a. After the conductive terminal 22b passes through the second locking slot 123a, the second protrusion 123b engages the through hole 24b. The structural interference caused by the engagement prevents the jumper 100 from being detached from the conductive terminals 22a and the conductive terminals 22b. Further, as shown in FIG. 3B, a solder material 30 is disposed at a junction between the first engaging portion 122 and the conductive terminal 22a. The solder material 30 covers at least a part of the first engaging portion 122 and at least a part of the conductive terminal 22a, and is filled into the first locking slot 122a and the through hole 24a, so as to electrically connect the first engaging portion 122 and the conductive terminal 22a. In this way, the stability of mechanical connection and electrical connection of the first engaging portion 122 and the conductive terminal 22a is improved. The design of the first locking slot 122a and the through hole 24a is not only advantageous for the solder operation, but also helpful to improve the bonding strength of the solder material 30 to the first engaging portion 122 and the conductive terminal 22a. In addition, it should be noted that, the solder material may be provided at junctions of other engaging portions and corresponding conductive terminals, which is not described here for the brevity.

With reference to FIG. 1, FIG. 2, and FIG. 3A, in this embodiment, the conductive bodies 120 include two first conductive body 120a and one second conductive body 120b. The second conductive bodies 120b are located between the first conductive bodies 120a. Specifically, the first conductive bodies 120a have identical structural design, and are symmetrically disposed on opposite sides of the second conductive body 120b. Furthermore, the first locking slots 122a of the first conductive body 120a are aligned with each other, and openings 122a1 of the first locking slots 122a face each other. Similarly, the second locking slots 123a of the two first conductors 120a are aligned with each other, and openings 123a1 of the second locking slots 123a face each other. Based on this structural design and arrangements, when the jumper 100 is connected in series to the first socket 20a and the second socket 20b, degree of freedom for the movement of the jumper 100 in a second direction (D2) is limited. The second direction (D2) traverses the first direction D1, and for example, the first direction (D1) and the second direction (D2) are perpendicular to each other. On the other hand, the first engaging portion 122 and the second engaging portion 123 of the second conductive body 120b may be configured without a protrusion inside the locking slot, and the opening of the locking slot of the second conductive body 120b may face any one of the first conductive body 120a.

Referring to FIG. 2, in this embodiment, the first engaging portions 122 of the two first conductors 120a are aligned with each other. A shortest connection line (L1) between the first engaging portions 122 of the first conductive bodies 120a is spaced apart from the first engaging portion 122 of the second conductive body 120b with a distance in the first direction (D1). Similarly, the second engaging portions 123 of the two first conductors 120a are aligned with each other. A shortest connection line (L2) between the second engaging portions 123 of the first conductive body 120b is spaced apart from the second engaging portion 123 of the second conductive body 120b with a distance in the first direction (D1). In other words, the second conductive body 120b is offset from the two first conductive bodies 120a in the first direction (D1).

In addition, the insulative body 110 is provided with at least one first stopping portion 111 on a side which the first engaging portion 122 of each first conductive body 120a extends therefrom. Specifically, the first stopping portion 111 is disposed between the first engaging portion 122 of each of the first conductive bodies 120a and the first engaging portion 122 of the second conductive body 120b. The first stopping portion 111 separates the first engaging portion 122 of the second conductive body 120b from the first engaging portion 122 of a corresponding one of the first conductive bodies 120a, and prevents melted solder from overflow during solder operation. The first stopping portion 111 also prevents the first engaging portion 122 of the second conductive body 120b from connecting with the first engaging portion 122 of any one of the first conductive bodies 120a, so as to avoid short circuit. Similarly, the insulative body 110 is provided with at least one second stopping portion 112 on a side where the second engaging portions 123 of each first conductive body 120a extend therefrom. Specifically, the second stopping portion 112 is disposed between the second engaging portion 123 of each of the first conductive bodies 120a and the second engaging portion 123 of the second conductive body 120b. The second stopping portion 112 separates the second engaging portion 123 of the second conductive body 120b from the second engaging portion 123 of a corresponding one of the first conductive bodies 120a, and prevents melted solder from overflow during solder operation. The second stopping portion 112 also prevents the second engaging portion 123 of the second conductive body 120b from connecting with the second engaging portion 123 of any one of the first conductive bodies 120a, so as to avoid short circuit.

Other embodiments are described below wherein technical content and technical effects identical to the previous embodiment are not repeated, and only differences of the following embodiment will be explained.

Figure 4:
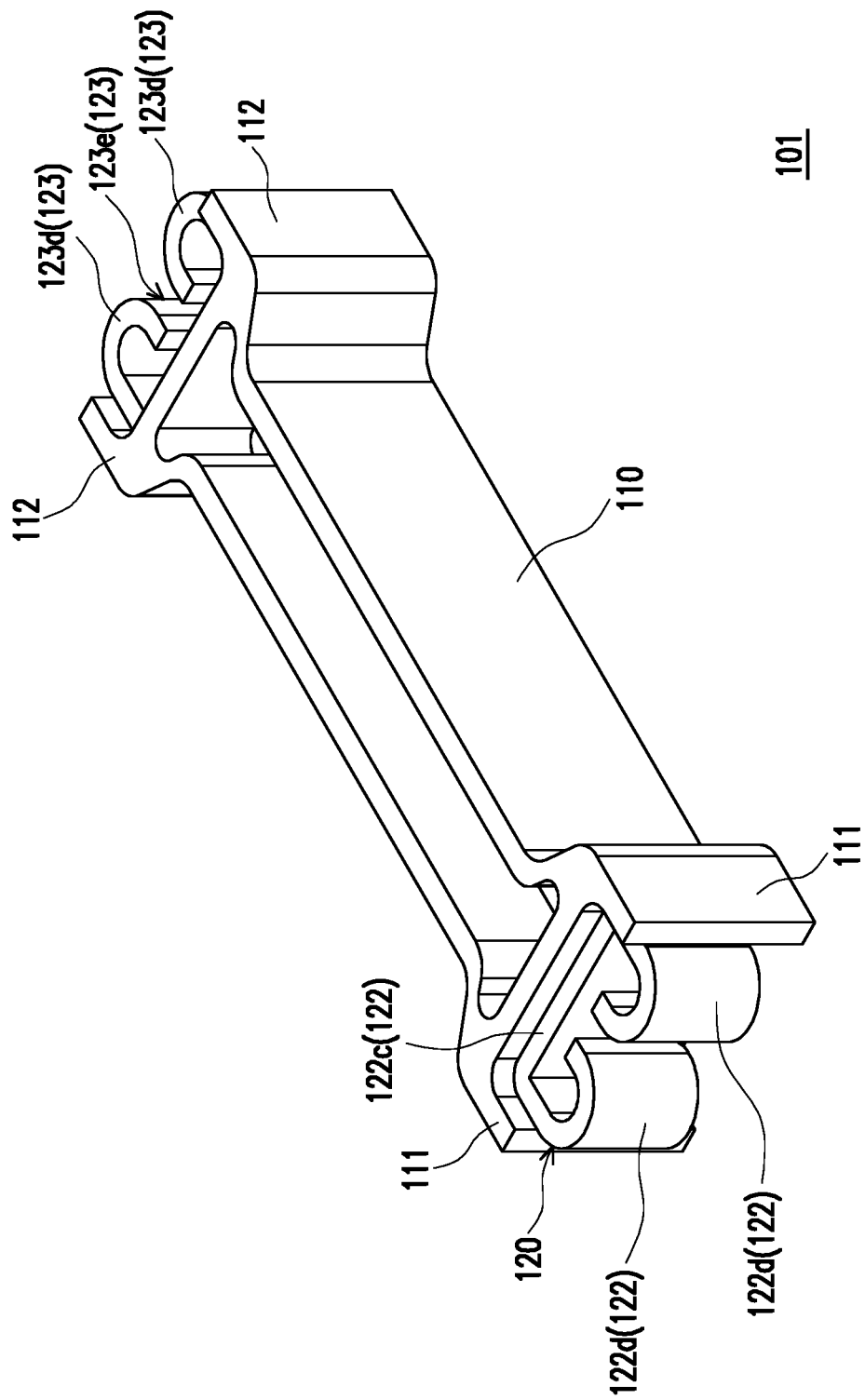
FIG. 4 illustrates a schematic view of a jumper according to another embodiment of the invention.
Figure 5:
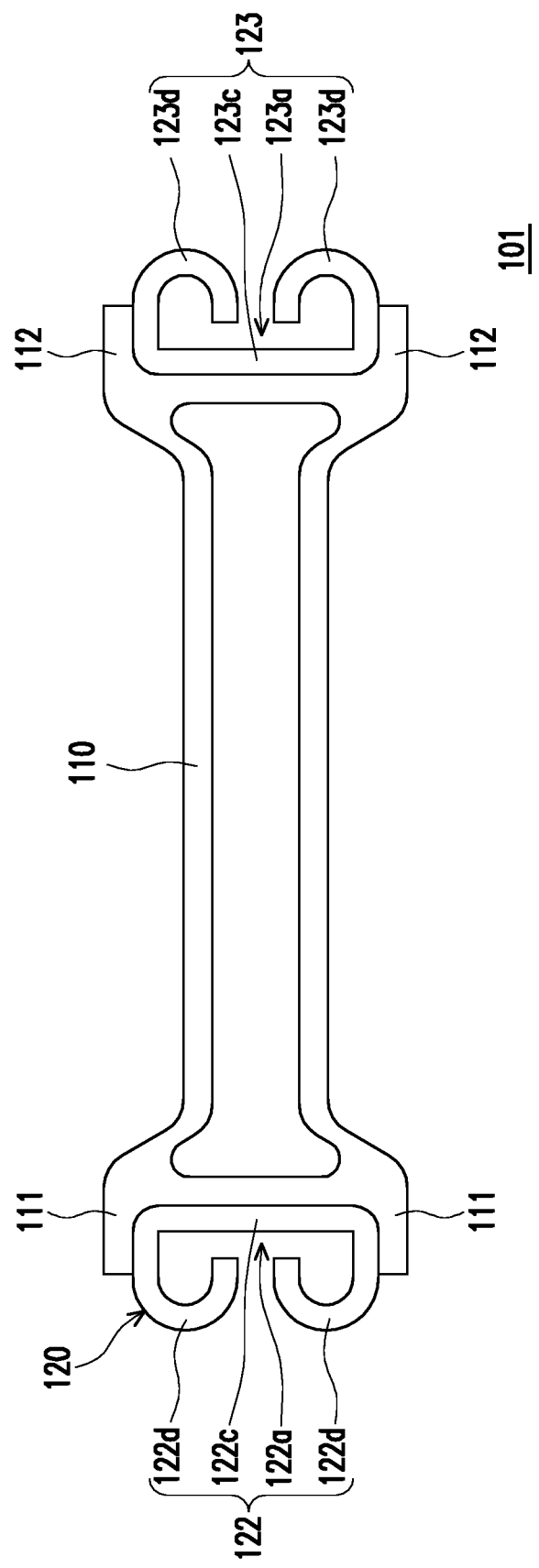
FIG. 5 illustrates a top view of the jumper according to FIG. 4.
Figure 6A:
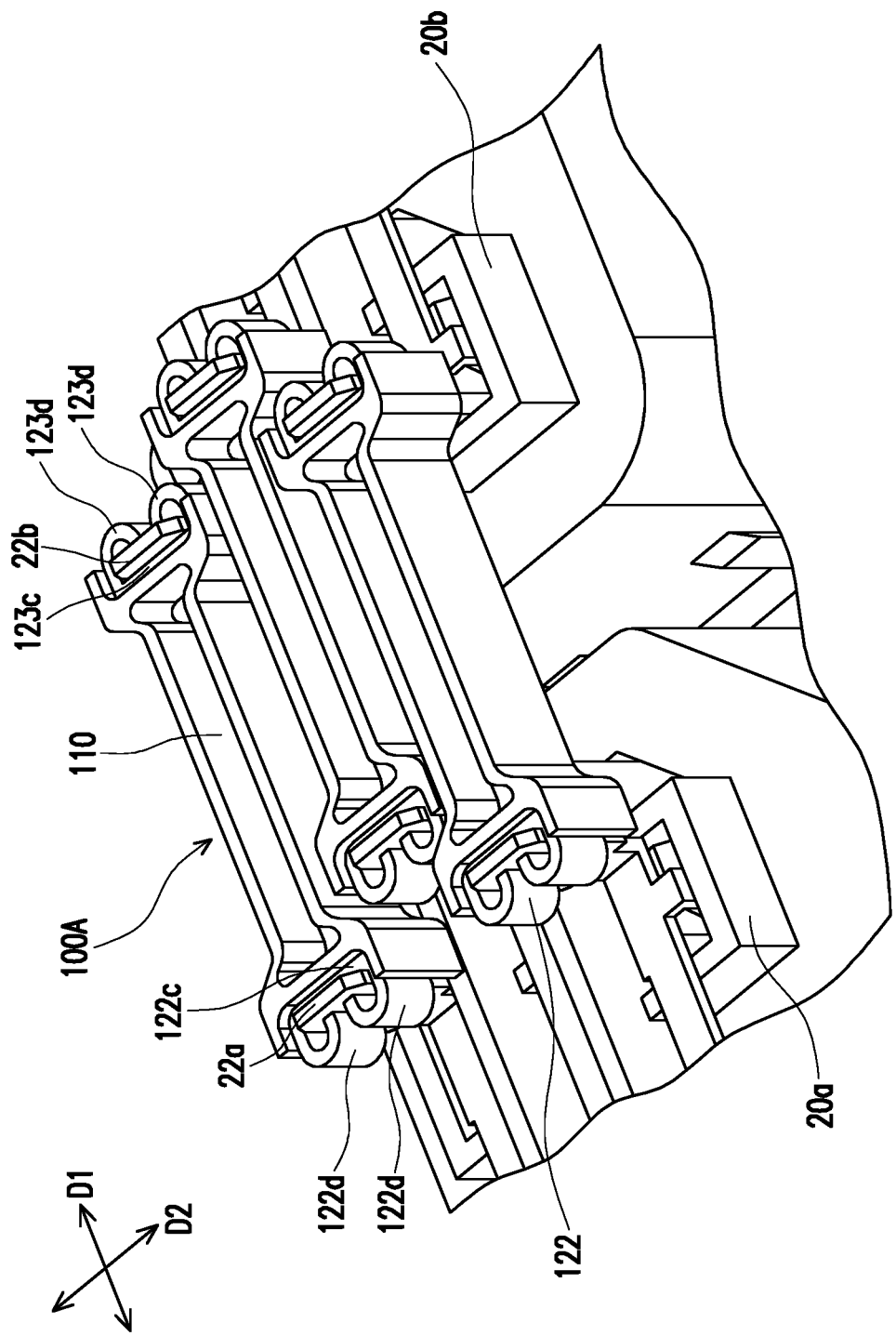
FIG. 6A illustrates a schematic view of the jumper shown in FIG. 4 being connected between two sockets of the power distribution unit which is partially shown.
Figure 6B:
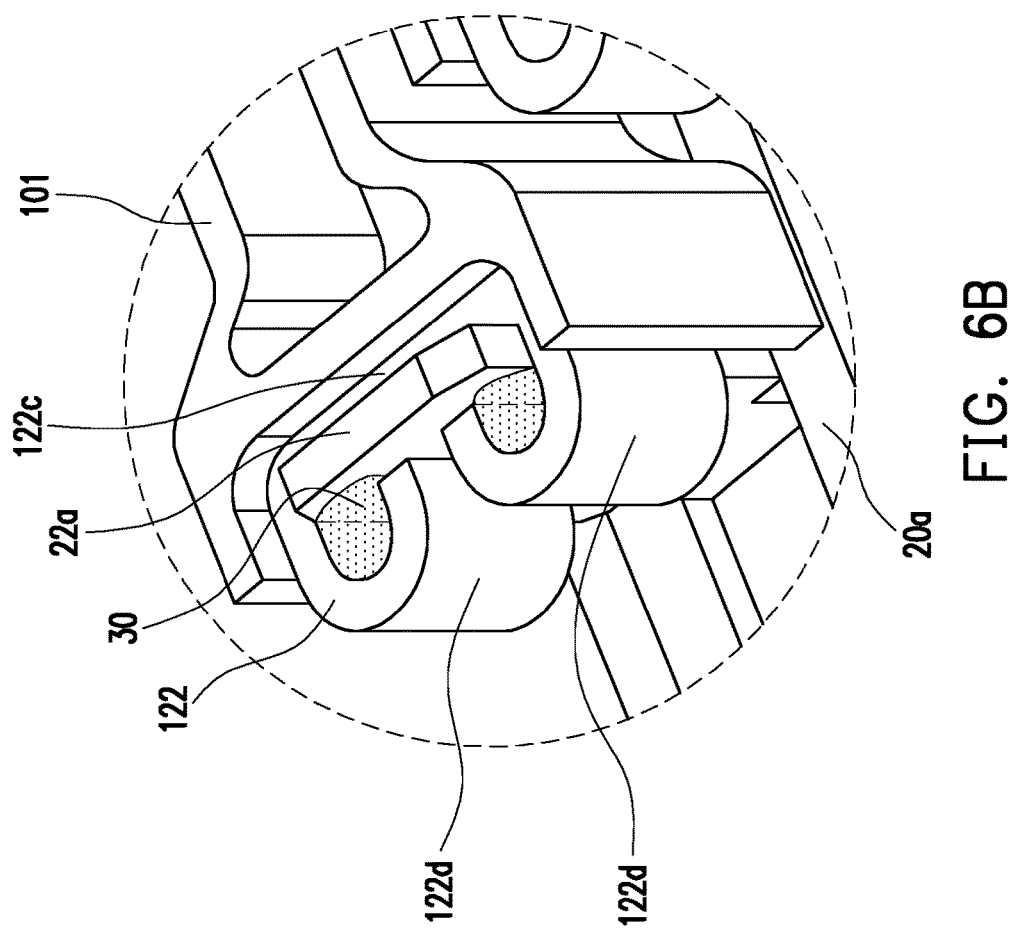
FIG. 6B illustrates an enlarged schematic view showing a solder material that is disposed between a junction of an engaging portion and a conductive terminal of FIG. 6A.

FIG. 4 illustrates a schematic view of a jumper according to another embodiment of the invention. FIG. 5 illustrates a top view of the jumper according to FIG. 4. FIG. 6A illustrates a schematic view of the jumper shown in FIG. 4 being connected between two sockets of the power distribution unit which is partially shown. FIG. 6B illustrates an enlarged schematic view showing a solder material that is disposed between a junction of an engaging portion and a conductive terminal of FIG. 6A. Referring to FIG. 4, FIG. 5, FIG. 6A, and FIG. 6B, the main difference between a jumper 100A of the present embodiment and the jumper 100 of the previous embodiment is that: the jumper 100A of this embodiment includes three insulative bodies 110 and three conductive bodies 120. Specifically, one of the insulative bodies 110 and one of the conductive bodies 120 form a sub-jumper 101. Three sub jumpers 101 are sequentially arranged in a second direction (D2), and the sub-jumper 101 in the middle is offset from the other two sub jumpers 101 in a first direction (D1).

For one of the sub-jumpers 101, in this embodiment, the first engaging portion 122 of the conductive body 120 has a first limiting part 122c, and two first hooks 122d extending from opposite sides of the first limiting part 122c. The second engaging portion 123 of the conductive body 120 has a second limiting part 123c, and two second hooks 123d extending from opposite sides of the second limiting part 123c. Specifically, the first hooks 122d extend from the first limiting part 122c, and are bent toward each other and a surface of the first limiting part 122c. Similarly, the second hooks 123d extend from the second limiting part 123c, and are bent toward each other and a surface of the second limiting part 123c.

Further, in this embodiment, the first limiting part 122c of the first engaging portion 122 and the first hooks 122d cooperatively surround a first locking slot 122a. The second limiting portion 123c of the second engaging portion 123 and the second hooks 123d cooperatively surround a second locking slot 123a. Based on this structural design and arrangements, when the jumper 100A of the embodiment is connected in series with the first socket 20a and the second socket 20b, for one of the sub jumpers 101, the conductive terminal 22a of the first socket 20a passes between the first hooks 122d and the first limiting part 122c (i.e., passes through the first locking slot 122a). At this time, the first limiting portion 122c abuts against a surface of the conductive terminal 22a, and ends of the second hooks 122d contact another surface of the conductive terminal 22a. Similarly, the conductive terminal 22b of the socket 20b passes between the second hooks 123d and the second limiting part 123c (i.e., passes through the second locking slot 123a). At this time, the second limiting portion 123c abuts against a surface of the conductive terminal 22b, and ends of the second hooks 123d contact another surface of the conductive terminal 22b. By virtue of the aforesaid structural design of the sub-jumper 101, the first and second conductive terminals 22a, 22b are electrically connected to each other. In addition, as shown in FIG. 6B, the solder material 30 is, for example, located between each of the first hooks 122d and the conductive terminals 22a, thus the first engaging portion 122 and the conductive terminal 22a are electrically connected. In this way, the stability of mechanical connection and electrical connection of the first engaging portion 122 and the conductive terminal 22a is improved. The design of the first locking slot 122a, the first limiting part 122c, and the first hooks 122d is not only advantageous for the solder operation, but also helpful to improve the bonding strength of the solder material 30 to the first engaging portion 122 and the conductive terminal 22a. It should be noted, the solder material may be provided at junctions of other engaging portions and corresponding conductive terminals, which is not described here for the brevity.

In this embodiment, the insulative body 110 of each of the sub-jumpers 101 is provided with two first stopping portions 111 on a side which the first engaging portion 122 extends therefrom. The insulative body 110 of each of the sub-jumpers 101 is provided with two second stopping portions 112 on a side which the second engaging portion 123 extends therefrom. The first stopping portions 111 separate the first engaging portion 122 of the adjacent two sub jumpers 101, so as to prevent melted solder from overflow during solder operation. Similarly, the second stopping portions 112 separates the second engaging portion 123 of the adjacent two sub jumpers 101, so as to prevent melted solder from overflow during solder operation.

In summary, the power distribution device of the invention uses a jumper to electrically connect two adjacent sockets. Specifically, each of the sockets includes at least one conductive terminal, and the opposite ends of the conductive body of the jumper may respectively engage two adjacent conductive terminals. Based on the engagement between the conductor body and the conductive terminals, the jumper is not easily separated from the conductive terminals. Therefore, the occurrence of wire detachment, short circuit, or poor contact, etc. can be prevented, and product reliability is improved. Furthermore, the operator can achieve the engagement between the conductive terminals and the conductive body in a quick manner, so as to allow electrical connection of the conductive terminals, thereby increasing the production efficiency. Hence, the design of the jumper of the invention is advantageous to the assembly work for the operator in the production line, and can significantly reduce assembly time.

Although the embodiments are already disclosed as above, these embodiments should not be construed as limitations on the scope of the invention. It will be apparent to those ordinarily skilled in the art that various modifications and variations may be made to the disclosed embodiments without departing from the scope or spirit of this invention. In view of the foregoing, it is intended that the invention covers modifications and variations provided that they fall within the scope of the following claims and their equivalents.

What is claimed is:

1. A jumper adapted to be disposed between two sockets, wherein each of the sockets has at least one conductive terminal, the jumper comprising:
    an insulative body; and
    at least one conductive body, having a main body portion, a first engaging portion, and a second engaging portion,
    wherein the main body portion is connected to the insulative body, the first engaging portion and the second engaging portion are respectively located on opposite sides of the main body portion, and extend respectively from opposite sides of the insulative body,
    wherein the first engaging portion engages the conductive terminal of one of the sockets, the second engaging portion engages the conductive terminal of the other one of the sockets, such that two conductive terminals are electrically connected to each other, and
    wherein the first engaging portion has a first locking slot, the second engaging portion has a second locking slot, the conductive terminal of the one of the sockets passes through the first locking slot, the conductive terminal of the other one of the sockets passes through the second locking slot.

2. The jumper according to claim 1, wherein the first engaging portion includes a first limiting part and two first hooks extending from opposite sides of the first limiting part, one of the first hooks is bent toward the other one of the first hooks and the first limiting part, the second engaging portion includes a second limiting part and two second hooks extending from opposite sides of the second limiting part, one of the second hooks is bent toward the other one of the second hooks and the second limiting part.

3. The jumper according to claim 1, wherein the at least one conductive body includes a plurality of conductive bodies, the conductive bodies include two first conductive bodies and a second conductive body, the second conductive body is located between the first conductive bodies, and the main body portion of each of the first conductive bodies and the main body portion of the second conductive body are disposed inside the insulative body.

4. The jumper according to claim 1, wherein the insulative body is provided with at least one first stopping portion on a side which the first engaging portion extends therefrom, the insulative body is provided with at least one second stopping portion on a side which the second engaging portion extends therefrom.

5. The jumper according to claim 1, wherein solder materials are disposed at a junction between the first engaging portion and the conductive terminal of the one of the sockets, and disposed at a junction between the second engaging portion and the conductive terminal of the other one of the sockets, respectively, such that the first engaging portion is electrically connected to the conductive terminal of the one of the sockets, and the second engaging portion is electrically connected to the conductive terminal of the other one of the sockets.

6. The jumper according to claim 1, wherein the first engaging portion further has a first protrusion located in the first locking slot, the second engaging portion further has a second protrusion located in the second locking slot,
    wherein each of the conductive terminals has a through hole, the first protrusion engages the through hole of one of the conductive terminals, and the second protrusion engages the through hole of the other one of the conductive terminals.

7. The jumper according claim 2, wherein the conductive terminal of the one of the sockets passes between the first hooks and the first limiting part, and contacts an end of each of the first hooks, the conductive terminal of the other one of the sockets passes between the second hooks and the second limiting part, and contacts an end of each of the second hooks.

8. The jumper according to claim 3, wherein the first engaging portions of the first conductive bodies are aligned with each other, and a shortest connection line between the first engaging portions of the first conductive bodies is spaced apart with a distance from the first engaging portion of the second conductive body.

9. The jumper according to claim 3, wherein the second engaging portions of the first conductive bodies are aligned with each other, and a shortest connection line between the second engaging portions of the first conductive bodies is spaced apart with a distance from the second engaging portion of the second conductive body.

10. The jumper according to claim 3, wherein the first engaging portion of each of the first conductive bodies has a first locking slot, two first locking slots of the first engaging portions of the first conductive bodies are aligned with each other, and an opening of one of the first locking slots faces an opening of the other one of the first locking slots.

11. The jumper according to claim 3, wherein the second engaging portion of each of the first conductive bodies has a second locking slot, two second locking slots of the second engaging portions of the first conductive bodies are aligned with each other, and an opening of one of the second locking slots faces an opening of the other one of the second locking slots.

12. A power distribution device comprising:
    two sockets, each having at least one conductive terminal; and
    a jumper, disposed between the sockets, the jumper comprising:
        an insulative body; and
        at least one conductive body, having a main body portion, a first engaging portion, and a second engaging portion,
    wherein the main body portion is connected to the insulative body, the first engaging portion and the second engaging portion are respectively located on opposite sides of the main body portion, and extends respectively from opposite sides of the insulative body,
    wherein the first engaging portion engages the conductive terminal of one of the sockets, the second engaging portion engages the conductive terminal of the other one of the sockets, such that two conductive terminals are electrically connected to each other, and
    wherein the first engaging portion has a first locking slot, the second engaging portion has a second locking slot, the conductive terminal of the one of the sockets passes through the first locking slot, the conductive terminal of the other one of the sockets passes through the second locking slot.

13. The power distribution device according to claim 12, wherein the first engaging portion further has a first protrusion located in the first locking slot, the second engaging portion further has a second protrusion located in the second locking slot,
    wherein each of the conductive terminals has a through hole, the first protrusion engages the through hole of the conductive terminal of the one of the sockets, and the second protrusion engages the through hole of the conductive terminal of the other one of the sockets.

14. The power distribution device according to claim 12, wherein the first engaging portion includes a first limiting part and two first hooks extending from opposite sides of the first limiting part, one of two first hooks is bent toward the other of the first hooks and the first limiting part, the second engaging portion includes a second limiting part and two second hooks extending from opposite sides of the second limiting part, one of the second hooks is bent toward the other one of the second hooks and the second limiting part.

15. The power distribution device according to claim 12, wherein the at least one conductive body includes a plurality of conductive bodies, the conductive bodies include two first conductive bodies and a second conductive body, the second conductive body is located between two first conductive bodies, and the main body portion of each of the first conductive bodies and the main body portion of the second conductive body are disposed inside the insulative body.

16. The power distribution device according to claim 12, wherein the insulative body is provided with at least one first stopping portion on a side which the first engaging portion extends therefrom, the insulative body is provided with at least one second stopping portion on a side which the second engaging portion extends therefrom.

17. The power distribution device according to claim 12, wherein solder materials are disposed at a junction between the first engaging portion and the conductive terminal of the one of the sockets, and disposed at a junction between the second engaging portion and the conductive terminal of the other one of the sockets, respectively, such that the first engaging portion is electrically connected to the conductive terminal of the one of the sockets, and the second engaging portion is electrically connected to the conductive terminal of the other one of the sockets.

18. The power distribution device according to claim 14, wherein the conductive terminal of the one of the sockets passes between the first hooks and the first limiting part, and contacts an end of each of the first hooks, the conductive terminal of the other one of the sockets passes between the second hooks and the second limiting part, and contacts an end of each of the second hooks.

19. The power distribution device according to claim 15, wherein the first engaging portions of the first conductive bodies are aligned with each other, and a shortest connection line between the first engaging portions of the first conductive bodies is spaced apart with a distance from the first engaging portion of the second conductive body.

20. The power distribution device according to claim 15, wherein the first engaging portions of the first conductive bodies are aligned with each other, and a shortest connection line between the second engaging portions of two first conductive bodies is spaced apart with a distance from the second engaging portion of the second conductive body.

21. The power distribution device according to claim 15, wherein the first engaging portion of each of the first conductive bodies has a first locking slot, two first locking slots of the first engaging portions of the first conductive bodies are aligned with each other, and an opening of one of the first locking slots faces an opening of the other one of the first locking slots.

22. The power distribution device according to claim 15, wherein the second engaging portion of each of the first conductive bodies has a second locking slot, two second locking slots of the second engaging portions of the first conductive bodies are aligned with each other, and an opening of one of the second locking slots faces an opening of the other one of the second locking slots.

* * * * *